(12) United States Patent
Wu et al.

(10) Patent No.: US 11,907,834 B2
(45) Date of Patent: Feb. 20, 2024

(54) METHOD FOR ESTABLISHING DATA-RECOGNITION MODEL

(71) Applicant: DEEPMENTOR INC, Taipei (TW)

(72) Inventors: Hsin-I Wu, Hsinchu (TW); Wen-Ching Hsiao, Hsinchu (TW)

(73) Assignee: DEEPMENTOR INC, Taipei (TW)

( * ) Notice: Subject to any disclaimer, the term of this patent is extended or adjusted under 35 U.S.C. 154(b) by 1157 days.

(21) Appl. No.: 16/268,197

(22) Filed: Feb. 5, 2019

(65) Prior Publication Data

US 2019/0251434 A1    Aug. 15, 2019

(30) Foreign Application Priority Data

Feb. 14, 2018  (TW) .................. 107105434
Feb. 14, 2018  (TW) .................. 107105438
Mar. 30, 2018  (TW) .................. 107111172

(51) Int. Cl.
*G06N 3/08*  (2023.01)
*G06N 3/04*  (2023.01)

(52) U.S. Cl.
CPC .............. *G06N 3/08* (2013.01); *G06N 3/04* (2013.01)

(58) Field of Classification Search
CPC .................................. G06N 3/08; G06N 3/04
See application file for complete search history.

(56) References Cited

FOREIGN PATENT DOCUMENTS

| TW | 201710959 A | 3/2017 |
|---|---|---|
| TW | 201729124 A | 8/2017 |

OTHER PUBLICATIONS

Zhang, Yan, Erhu Zhang, and Wanjun Chen. "Deep neural network for halftone image classification based on sparse auto-encoder." Engineering Applications of Artificial Intelligence 50 (2016): 245-255. (Year: 2016).*
Simpson, Andrew JR. "Parallel Dither and Dropout for Regularising Deep Neural Networks." arXiv preprint arXiv:1508.07130 (2015) (Year: 2015).*
Molchanov, Pavlo, et al. "Pruning convolutional neural networks for resource efficient inference." arXiv preprint arXiv:1611.06440 (2016). (Year: 2016).*
StackOverflow, et al. "How to Get Mean, Median, and Other Statistics over Entire Matrix, Array or Dataframe?" Stack Overflow, Mar. 27, 2013, https://stackoverflow.com/questions/9424311/how-to-get-mean-median-and-other-statistics-over-entire-matrix-array-or-dataf. (Year: 2013).*

(Continued)

*Primary Examiner* — Tsu-Chang Lee
(74) *Attorney, Agent, or Firm* — Hamre, Schumann, Mueller & Larson, P.C.

(57) ABSTRACT

A method for establishing a data-recognition model includes: generating (Z) number of Y-combinations of dithering algorithms from (X) number of dithering algorithms; for each Y-combination, performing a dithering operation on a to-be-processed data group, so as to obtain, in total, (Z) number of size-reduced data groups; performing training operations on a deep neural network using the size-reduced data groups, respectively, so as to generate, for each training operation, a DNN model and a steady deviation; and selecting the Y-combination corresponding to the size-reduced data group that results in the smallest steady deviation as a filter module, and selecting the corresponding DNN model as the data-recognition model.

39 Claims, 15 Drawing Sheets

(56) References Cited

OTHER PUBLICATIONS

Liang, Ming, Xiaolin Hu, and Bo Zhang. "Convolutional neural networks with intra-layer recurrent connections for scene labeling." Advances in neural information processing systems 28 (2015). (Year: 2015).*

Wang, Gang. "A novel neural network model specified for representing logical relations." arXiv preprint arXiv:1708.00580 (2017). (Year: 2017).*

Yellamraju, Suryateja, et al. "Design of various logic gates in neural networks." 2013 Annual IEEE India Conference (INDICON). IEEE, 2013. (Year: 2013).*

Augasta, M., and Thangairulappan Kathirvalavakumar. "Pruning algorithms of neural networks-a comparative study." Open Computer Science 3.3 (2013): 105-115. (Year: 2013).*

Tecmath. Combinations Made Easy. YouTube, YouTube, Jun. 2, 2017, https://www.youtube.com/watch?v=w1nlzDAVyzk. (Year: 2017).*

Search Report appended to an Office Action, which was issued to Taiwanese counterpart application No. 107105438 by the TIPO dated Dec. 21, 2018, with an English translation thereof (2 pages).

* cited by examiner

Neuron SN₁

| 9 | 36 | 27 |
|---|----|----|
| 7 | 97 | 35 |
| 36 | 1 | 77 |

Neuron SN₂

| 8 | 36 | 27 |
|---|----|----|
| 7 | 97 | 33 |
| 37 | 1 | 77 |

FIG. 15

METHOD FOR ESTABLISHING DATA-RECOGNITION MODEL

CROSS-REFERENCE TO RELATED APPLICATION

This application claims priority of Taiwanese Patent Application No. 107105438, filed on Feb. 14, 2018, Taiwanese Patent Application No. 107105434, filed on Feb. 14, 2018, and Taiwanese Patent Application No. 107111172, filed on Mar. 30, 2018.

FIELD

The disclosure relates to a method and a system for establishing a data-recognition model, and more particularly to a method and a system for establishing a data-recognition model using deep neural network (DNN).

BACKGROUND

Artificial Intelligence (AI) technologies have been progressing rapidly and can be applied in various fields such as self-driving vehicles, image recognition, data analysis, etc. A deep neural network (DNN) is one of a number of machine learning structures that is widely used in AI technologies for processing data and performing tasks. In use, the DNN incorporates a mathematical model that mimics a biological neural network and that includes a number of layers (hence being "deep"). In particular, the DNN is provided with a large amount of data, and performs arithmetic operations based on the data repeatedly for adjusting the mathematical model (a procedure known as "training"), so as to obtain an optimized mathematical model that is the most effective for the DNN.

It is noted that during the procedure of training the DNN, a large number of arithmetic operations are needed and many parameters are generated for the DNN, bloating the size of the DNN.

SUMMARY

Therefore, one object of the disclosure is to provide a method that can reduce an amount of data contained in a deep neural network.

According to one embodiment of the disclosure, the method for establishing a data-recognition model is implemented by a computer system that stores a deep neural network (DNN) and a set of a number (X) of dithering algorithms, where $X \geq 2$. The method includes steps of:

A) generating a number (Z) of Y-combinations of dithering algorithms from the set of the number (X) of dithering algorithms, each of the Y-combinations including a number (Y) of dithering algorithms, where $1 \leq Y \leq (X-1)$;

B) for each of the number (Z) of Y-combinations of dithering algorithms, using the number (Y) of dithering algorithms of the Y-combination to perform a dithering operation on a to-be-processed data group represented in (a) number of bit(s), so as to obtain, in total, a number (Z) of size-reduced data groups each being represented in (b) number of bit(s), where $1 \leq b \leq (a-1)$;

C) performing a number (Z) of training operations on the DNN using the number (Z) of size-reduced data groups, respectively, so as to generate, for each of the number (Z) of training operations, a DNN model, a training result of the training operation, and a steady deviation between the training result and a predetermined expectation; and D) selecting one of the number (Z) of Y-combinations of dithering algorithms corresponding to the size-reduced data group that results in the training result with the smallest steady deviation as a filter module, and selecting the corresponding DNN model as the data-recognition model.

Another object of the disclosure to provide a computer system that is configured to implement the above-mentioned method.

According to one embodiment of the disclosure, the computer system is for establishing a data-recognition model includes a data storage and a processor.

The data storage stores a deep neural network (DNN) and a set of a number (X) of dithering algorithms, where $X \geq 2$. The processor (2) coupled to said data storage (1) and programmed to implement the steps of:

A) generating a number (Z) of Y-combinations of dithering algorithms from the set of the number (X) of dithering algorithms, each of the Y-combinations including a number (Y) of dithering algorithms, where $1 \leq Y \leq (X-1)$;

B) for each of the number (Z) of Y-combinations of dithering algorithms, using the number (Y) of dithering algorithms of the Y-combination to perform a dithering operation on a to-be-processed data group represented in (a) number of bit(s), so as to obtain, in total, a number (Z) of size-reduced data groups each being represented in (b) number of bit(s), where $1 \leq b \leq (a-1)$;

C) performing a number (Z) of training operations on the DNN using the number (Z) of size-reduced data groups, respectively, so as to generate, for each of the number (Z) of training operations, a DNN model, a training result of the training operation, and a steady deviation between the training result and a predetermined expectation; and D) selecting one of the number (Z) of Y-combinations of dithering algorithms corresponding to the size-reduced data group that results in the training result with the smallest steady deviation as a filter module, and selecting the corresponding DNN model as the data-recognition model.

BRIEF DESCRIPTION OF THE DRAWINGS

Other features and advantages of the disclosure will become apparent in the following detailed description of the embodiments with reference to the accompanying drawings, of which:

FIG. 15 is a schematic view illustrating two exemplary neurons to be compared with each other to obtain a summation of weight differences.

DETAILED DESCRIPTION

Figure 1:
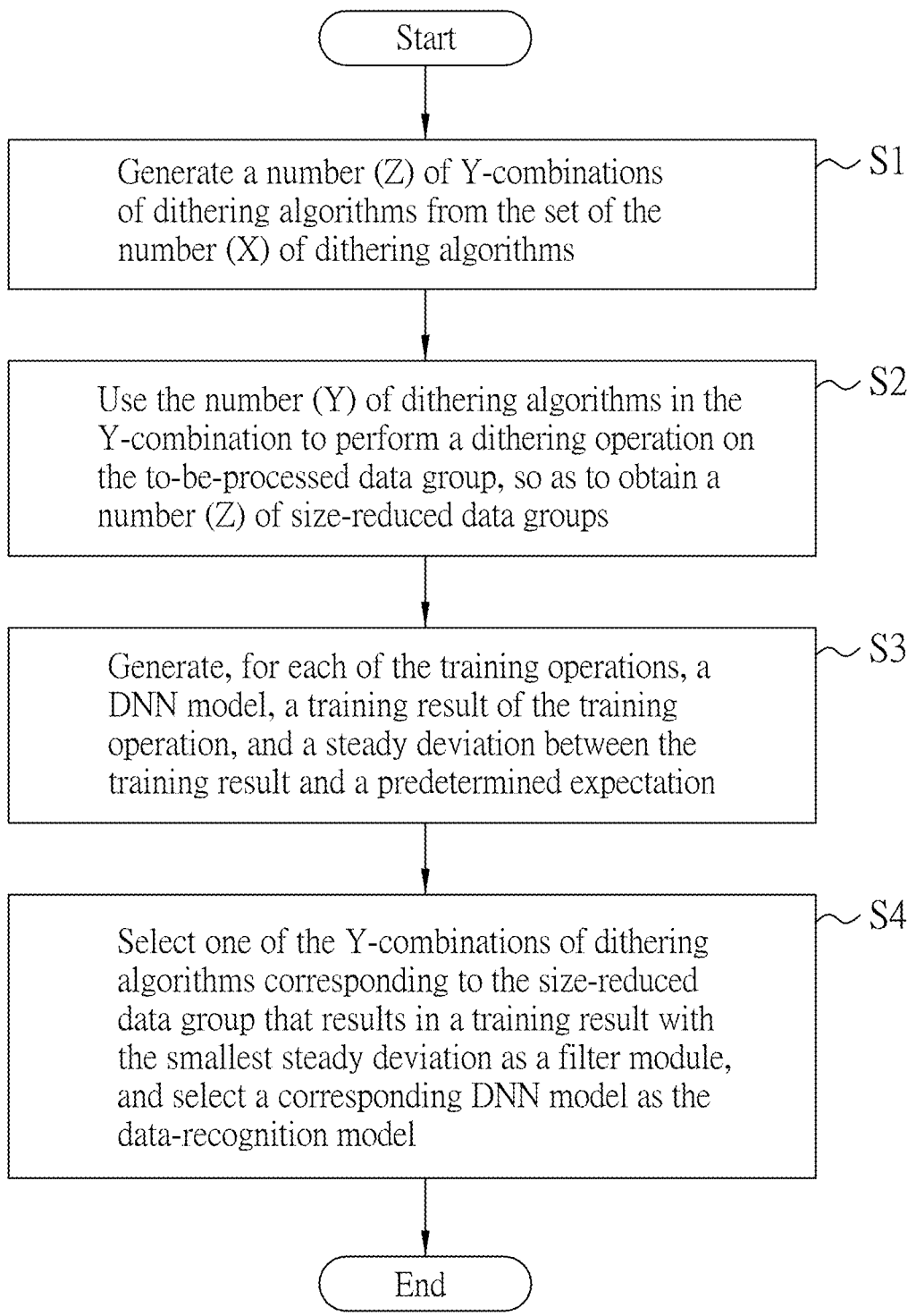
FIG. 1 is a flow chart illustrating steps of a method for establishing a data-recognition model according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a flow chart illustrating steps of a method for establishing a data-recognition model according to one embodiment of the disclosure.

Figure 2:
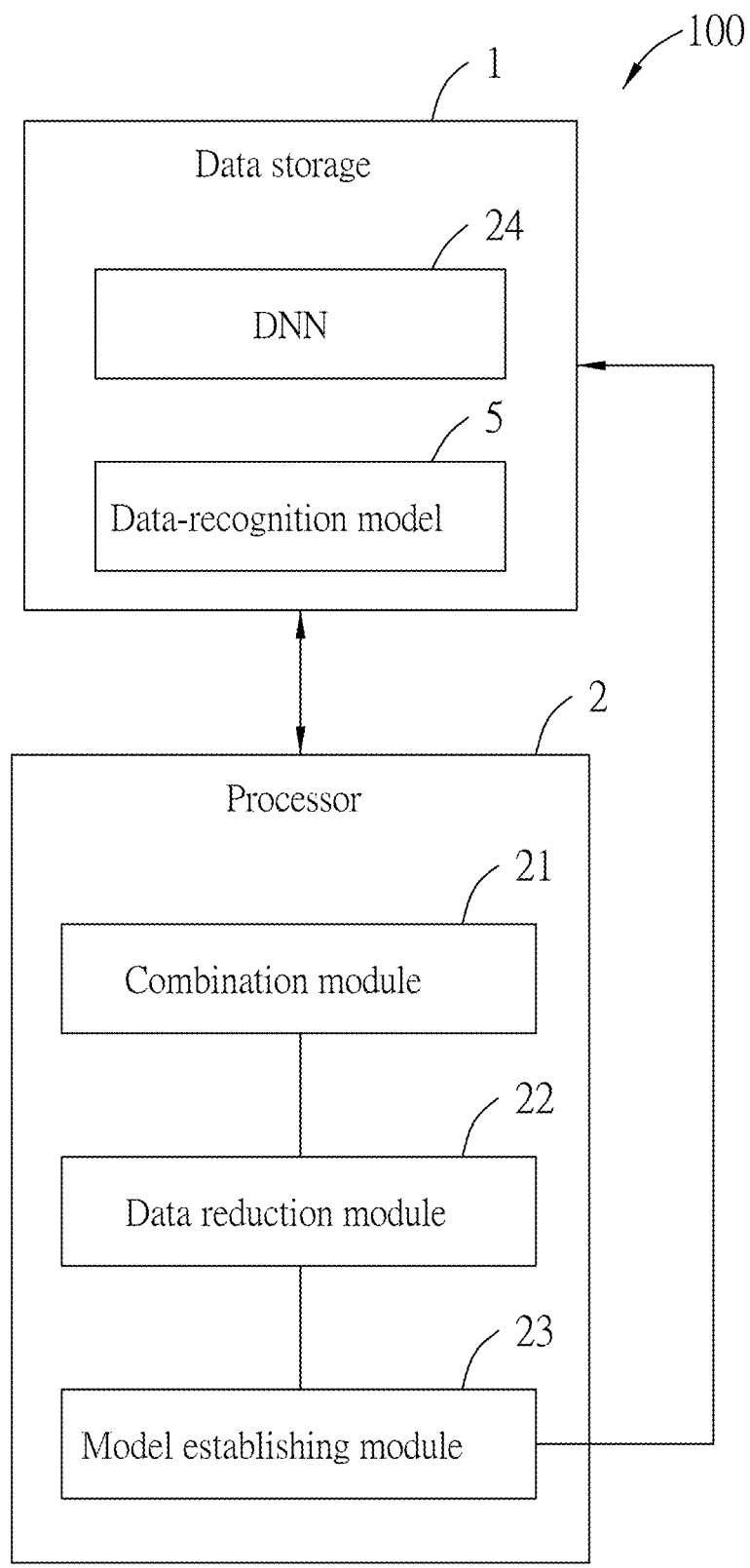
FIG. 2 is a block diagram illustrating components of a computer system according to one embodiment of the disclosure.

FIG. 2 is a block diagram illustrating components of a computer system 100 according to one embodiment of the disclosure. In one embodiment, the method of FIG. 1 may be implemented using the computer system 100 of FIG. 2.

The computer system 100 includes a data storage 1 and a processor 2. The data storage 1 may include, but not limited to, a hard disk, a solid state disk (SSD), a flash drive, or various types of non-transitory storage medium. The processor 2 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The data storage 1 stores a deep neural network (DNN) 24 and a set of a number (X) of dithering algorithms, where X≥2. The processor 2 is coupled to and communicates with the data storage 1, and includes a combination module 21, a data reduction module 22 and a model establishing module 23. In this embodiment, each of the combination module 21, the data reduction module 22 and the model establishing module 23 is implemented using software or firmware stored in the data storage 1 executed by the processor 2, and/or specifically designed hardware such as an application-specific integrated circuit (ASIC) chip, a programmable logic device (PLD).

In one embodiment, the data storage 1 and the processor 2 are integrated in a computer device, and the data storage 1 is coupled to the processor 2 using one of a wired connection and a wireless connection.

In this embodiment, the DNN 24 is provided with a to-be-processed data group that includes raw data (e.g., data constituting a number of images) for processing. In particular, the to-be-processed data group is represented in (a) number of bits.

In step S1, the combination module 21 of the processor 2 generates a number (Z) of Y-combinations of dithering algorithms from the set of the number (X) of dithering algorithms, where the number (Z) is equal to $C_Y^X$. Each of the Y-combinations includes a number (Y) of dithering algorithms, where $1 \leq Y \leq (X-1)$. In one example, the number (X) is 9, the number (Y) is 2, and the number (Z) is $C_2^9=36$. The 9 dithering algorithms may include, but not limited to, known algorithms such as "Floyd-Steinberg", "Jarvis, Judice & Ninke", "Stucki", "Burkes", "Sierra", "Two-row Sierra", "Sierra Lite", "Atkinson", and "Gradient-based".

In step S2, for each of the number (Z) of Y-combinations of dithering algorithms, the data reduction module 22 uses the number (Y) of dithering algorithms in the Y-combination to perform a dithering operation on the to-be-processed data group, so as to obtain, in total, a number (Z) of size-reduced data groups each being represented in (b) number of bit(s), where $1 \leq b \leq (a-1)$.

Figure 3:
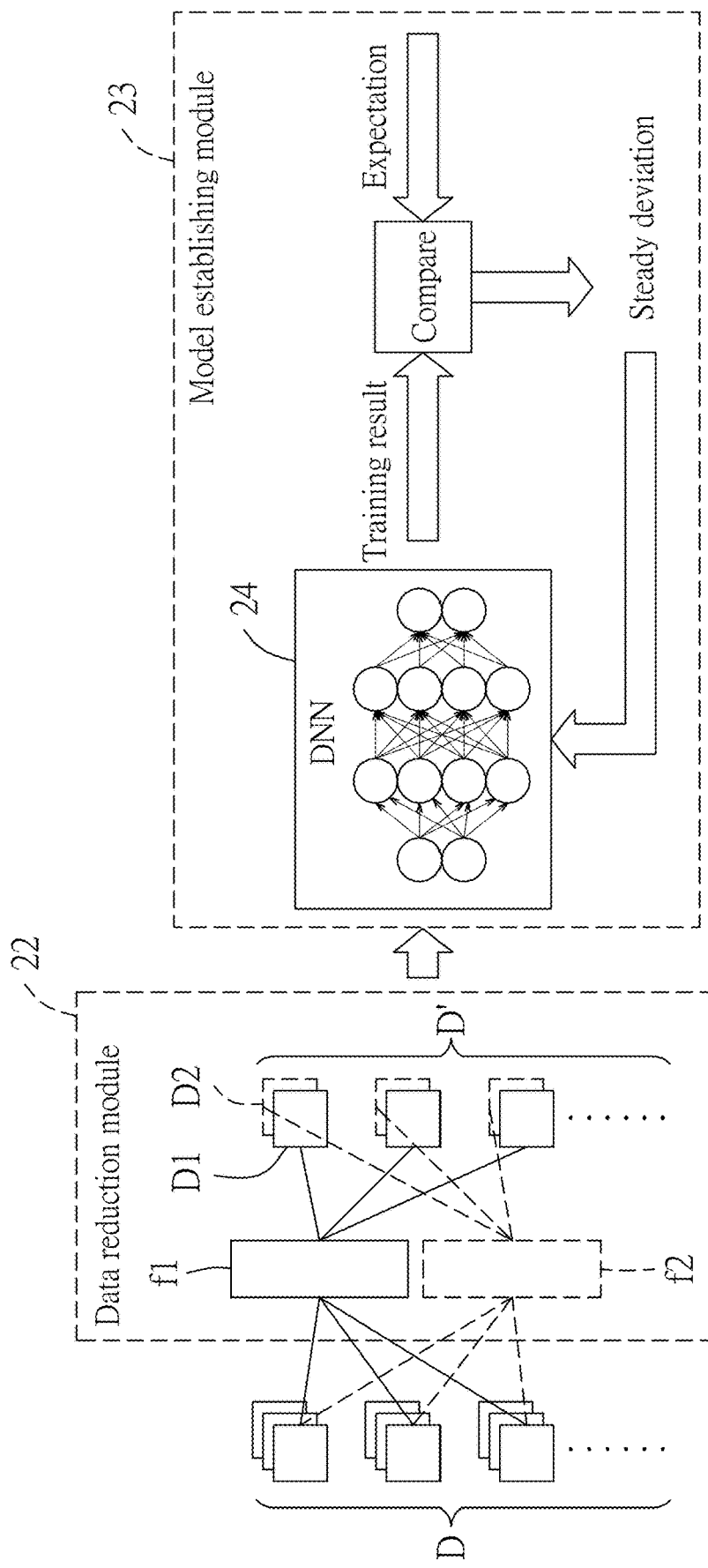
FIG. 3 is a schematic view illustrating operations of a data reduction module and a model establishing module of the computer system.

Specifically, as shown in FIG. 3, the to-be-processed data group (D) is fed to one of the number (Z) of Y-combinations of dithering algorithms, which may include two dithering algorithms (represented as (f1) and (f2)). The data reduction module 22 may first perform a dithering operation on the to-be-processed data group (D) using the dithering algorithm (f1), so as to obtain a first part of the size-reduced data group (D1) being represented in (m) number of bit(s). Then, the data reduction module 22 further performs a dithering operation on the to-be-processed data group (D) using the dithering algorithm (f2), so as to obtain a second part of the size-reduced data group (D2) being represented in (n) number of bit(s), where m+n=b.

Afterward, the data reduction module 22 combines the first part (D1) and the second part (D2) to obtain the size-reduced data group (D').

In one example, the to-be-processed data group (D) includes image data represented in 24 bits (i.e., a=24), the first part of the size-reduced data group (D1) is represented in 1 bit (i.e., m=1), the second part of the size-reduced data group (D2) is also represented in 1 bit (i.e., n=1), and thus the size-reduced data group (D') is represented in 2 bits (i.e., b=2).

As such, since the relation $b \leq (a-1)$ is satisfied, the data group (D') may be represented by a lower number of bits.

In step S3, the model establishing module 23 performs a number (Z) of training operations on the DNN 24 using the number (Z) of size-reduced data groups, respectively, so as to generate, for each of the number (Z) of training operations, a DNN model, a training result of the training operation, and a steady deviation between the training result and a predetermined expectation. The training result may include one or more parameters regarding the training operation, such as a rate of recognition. The predetermined expectation may include one or more expected values of the one or more parameters, respectively.

Figure 4:
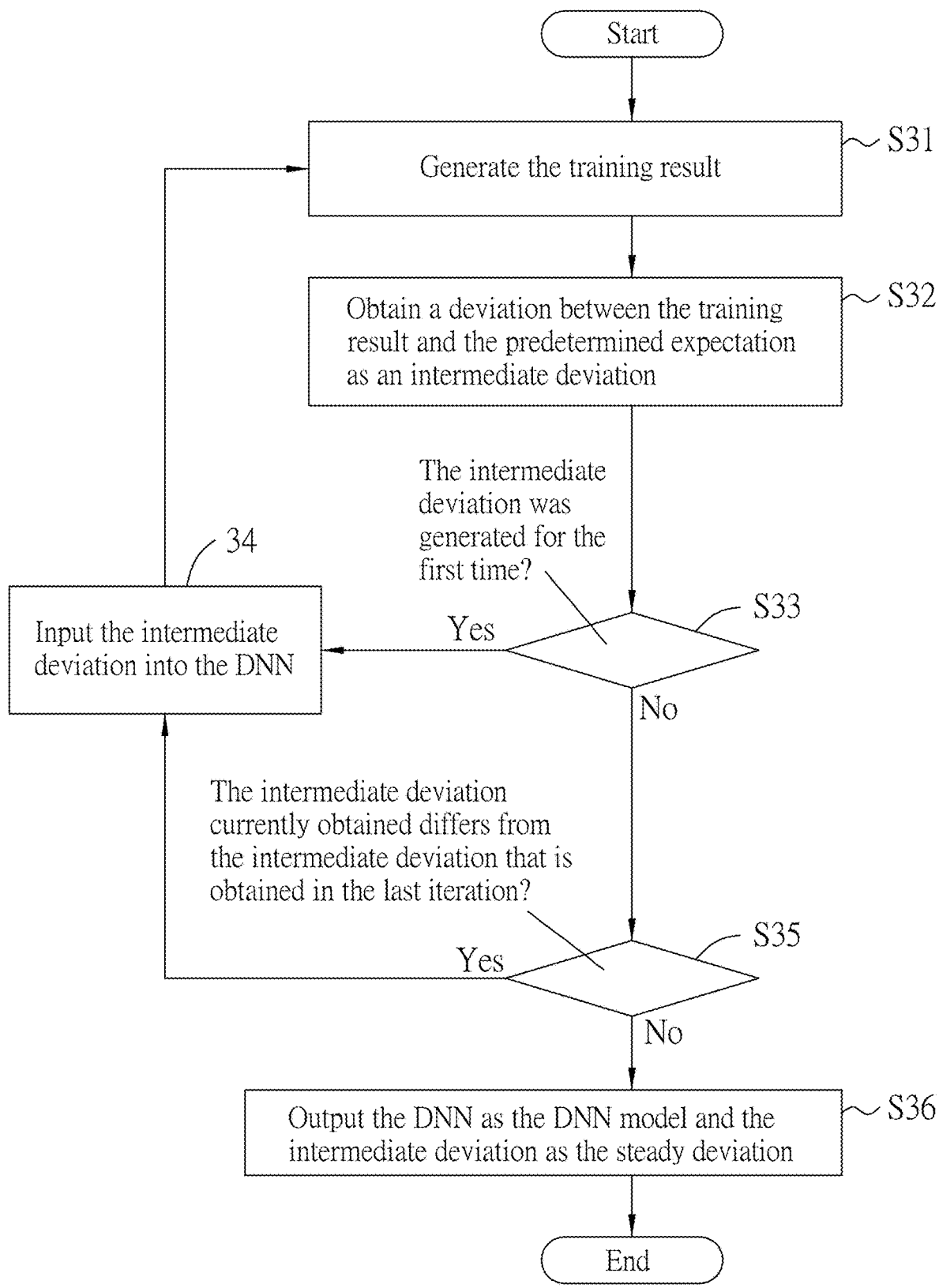
FIG. 4 is a flow chart illustrating sub-steps of performing a training operation on a deep neural network.

Specifically, one training operation performed in step S3 is illustrated in the sub-steps as shown in FIG. 4.

In sub-step S31, the model establishing module 23 inputs one of the size-reduced data groups (D') into the DNN 24, and in response the DNN 24 performs a series of predetermined arithmetic operations, so as to generate the training result.

In sub-step S32, the model establishing module 23 compares the training result with the predetermined expectation so as to obtain a deviation between the training result and the predetermined expectation as an intermediate deviation.

In sub-step S33, the model establishing module 23 determines whether the intermediate deviation was generated for the first time. For example, the model establishing module 23 may determine whether a previously obtained intermediate deviation exists in the DNN 24. When the determination is affirmative, the flow proceeds to sub-step S34. Otherwise, the flow proceeds to sub-step S35.

In sub-step S34, the model establishing module 23 inputs the intermediate deviation into the DNN 24, and the flow goes back to sub-step S31.

In sub-step S35, the model establishing module 23 determines whether the intermediate deviation currently obtained in sub-step S32 differs from the intermediate deviation that exists in the DNN 24 and that is obtained in the last iteration of sub-step S32. When the determination is affirmative, the flow proceeds to sub-step S34. Otherwise, the flow proceeds to sub-step S36. That is to say, the operations of sub-steps S31 to S35 will be iterated until the intermediate deviation currently obtained in sub-step S32 does not vary with respect to the intermediate deviation obtained in a previous iteration of sub-step S32 (i.e., the intermediate deviation currently obtained in sub-step S32 is identical to the intermediate deviation obtained in a previous iteration of sub-step S32).

In sub-step S36, the model establishing module 23 outputs the DNN 24 as the DNN model and the intermediate deviation currently obtained in sub-step S32 as the steady deviation.

It is noted that, for each of the number (Z) of training operations, one DNN model and one training result are obtained.

In step S4, the model establishing module 23 selects one of the number (Z) of Y-combinations of dithering algorithms corresponding to the size-reduced data group that results in a training result with the smallest steady deviation as a filter module, and selects a corresponding DNN model as the data-recognition model.

It is noted that using a Y-combination of dithering algorithms (as the filter module) with a smaller steady deviation is beneficial in that more features included in the to-be-processed data group may be maintained after being processed by the filter module (i.e., as a size-reduced data group), and therefore may achieve a higher accuracy in application. Moreover, the dithering algorithms within the Y-combination may be complementary with one another. As such, the filter module and the data-recognition model thus obtained can be applied in a follow-up compression operation or other related application(s).

In brief, the above embodiment provides a method and a computer system that are configured to generate a number (Z) of Y-combinations of dithering algorithms, and to use each of the number (Z) of Y-combinations of dithering algorithms to perform a dithering operation on the to-be-processed data group, so as to obtain a total of (Z) number of size-reduced data groups. The method and the computer system are configured to then perform a number (Z) of training operations on a DNN using the number (Z) of size-reduced data groups, so as to generate, for each of the number (Z) of training operations, a DNN model, a training result of the training operation, and a steady deviation between the training result and a predetermined expectation. Then, one of the number (Z) of Y-combinations of dithering algorithms corresponding to the size-reduced data group that results in a training result with the smallest steady deviation is selected as a filter module, and a corresponding DNN model is selected as the data-recognition model. In this manner, the data-recognition model thus generated may have a smaller number of parameters and a smaller size.

Figure 5:
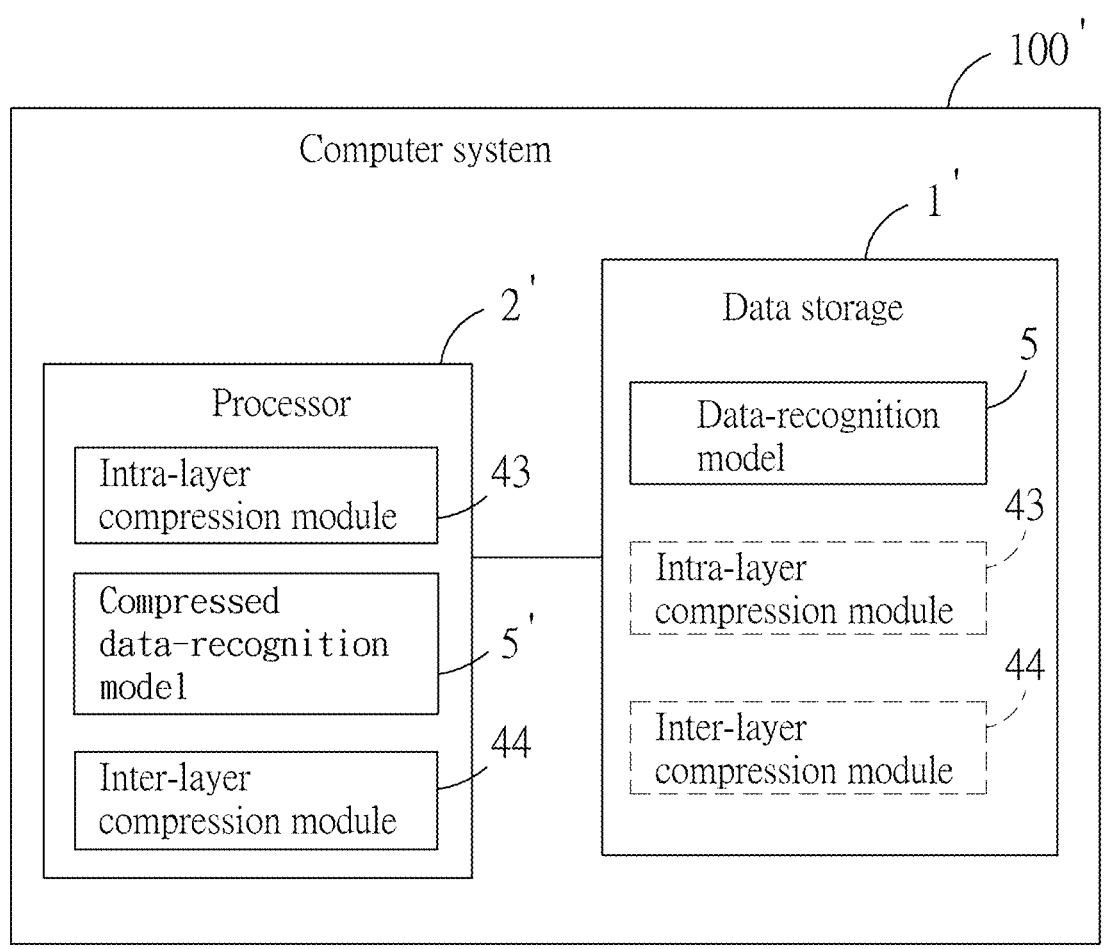
FIG. 5 is a block diagram illustrating components of a computer system according to one embodiment of the disclosure.

FIG. 5 is a block diagram illustrating components of a computer system 100' according to one embodiment of the disclosure.

In this embodiment, the computer system 100' includes a data storage 1' and a processor 2'. The data storage 1' and the processor 2' may be embodied using similar components as the data storage 1 and the processor 2 as described in the embodiment of FIG. 2.

The data storage 1' stores a data-recognition model 5. The processor 2' includes an intra-layer compression module 43 and an inter-layer compression module 44. In this embodiment, each of the intra-layer compression module 43 and the inter-layer compression module 44 is implemented using software stored in the data storage 1' or firmware included in a microcontroller (not depicted in the drawings) in the computer system 100' to be executed by the processor 2', and/or specifically designed hardware such as an application-specific integrated circuit (ASIC) chip, a programmable logic device (PLD).

Figure 7:
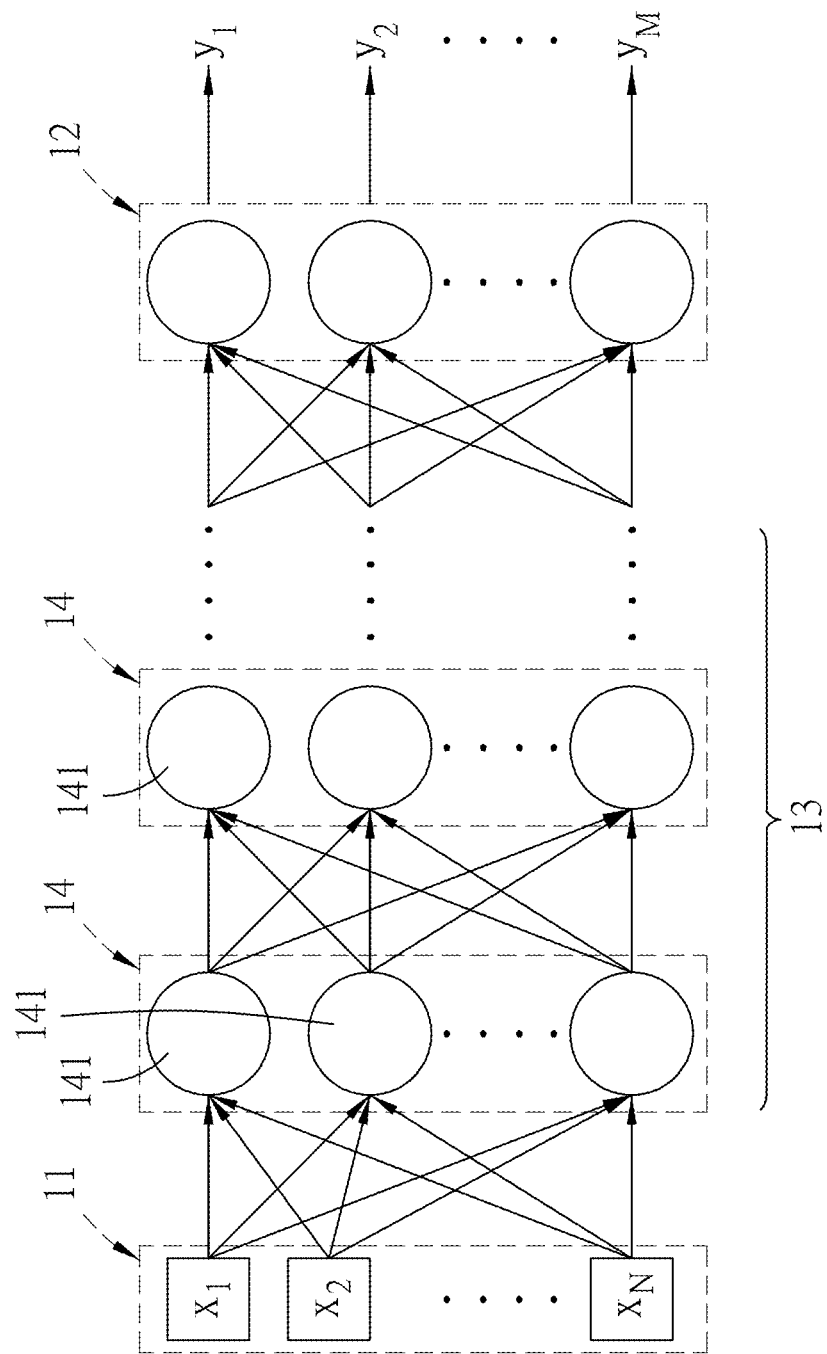
FIG. 7 is a schematic view illustrating an exemplary data-recognition model.

The data-recognition model 5 may be generated using the method illustrated in FIG. 1, and as shown in FIG. 7, includes an input layer 11, an output layer 12, and a hidden layer set 13 that interconnects the input layer 11 and the output layer 12.

The hidden layer set 13 includes a plurality of hidden layers 14 that are connected in series. Each of the plurality of hidden layers 14 includes a plurality of neurons 141. Each of the neurons 141 has a weight matrix 15 containing a plurality of weights (one example shown in FIG. 8) respectively for a plurality of arithmetic operations (e.g., multiplication operations).

It is noted that in the case that a specific weight matrix (e.g., a 3×3 weight matrix 15 shown in FIG. 8) is constituted by weights that are substantially similar to one another (e.g., all being identical to one another), the entire specific weight matrix may be replaced with a representative value so as to reduce the total number of arithmetic operations involved in the processing of data by the data-recognition model 5. Additionally, in the case that a specific weight matrix is constituted by weights that generate an output substantially equal to zero regardless of the input, the specific weight matrix may be removed from the data-recognition model 5 so as to reduce the overall size of the data-recognition model 5.

Figure 6:
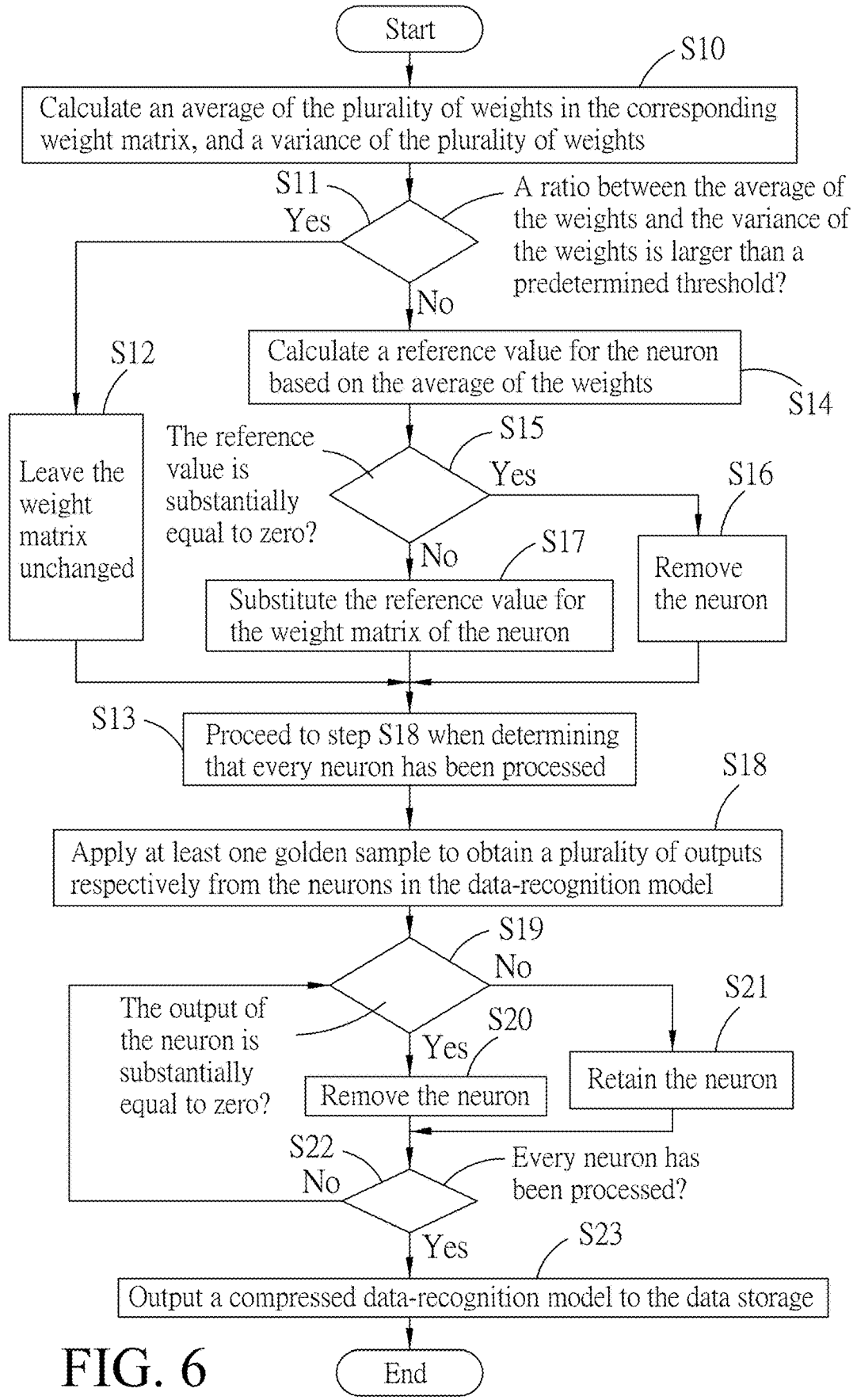
FIG. 6 is a flow chart illustrating a data-reduction procedure for determining whether one or more neurons may be removed or simplified according to one embodiment of the disclosure.

FIG. 6 is a flow chart illustrating an example of a data-reduction procedure for determining whether one or more of the neurons 141 included in the hidden layer set 13 should be removed or simplified as a representative value according to one embodiment of the disclosure.

In step S10, for each of the neurons 141 included in the plurality of hidden layers 14, the intra-layer compression module 43 calculates an average of the plurality of weights in the corresponding weight matrix, and a variance of the plurality of weights (which indicates how far the values of the plurality of weights generally deviate from the average of the plurality of weights). It is noted that in one example, the intra-layer compression module 43 may perform a checkup procedure to determine whether the calculations have been done with respect to each of the neurons 141 included in the plurality of hidden layers 14. When the determination is affirmative, the flow proceeds to step S11. Note that the procedure from step S11 going eventually into step S13 is performed with respect to each of the neurons 141.

In step S11, the intra-layer compression module 43 determines whether a ratio between the average of the plurality of weights and the variance of the plurality of weights is larger than a predetermined threshold. In particular, in this embodiment, the intra-layer compression module 43 determines whether a ratio of the variance to the average (i.e., the variance divided by the average) is larger than the predetermined threshold. In this embodiment, the predetermined threshold is 0.1.

When the determination is affirmative, it may be determined that the plurality of weights in the weight matrix are generally relatively far from the average. In such a case, the flow proceeds to step S12. Otherwise (when it is determined that the ratio of the variance of the plurality of weights to the average of the plurality of weights is not larger than the predetermined threshold), the flow proceeds to step S14.

In step S12, the intra-layer compression module 43 leaves the weight matrix unchanged. Then, the flow proceeds to step S13.

In step S14, the intra-layer compression module 43 calculates a reference value for the neuron 141, based on the average of the plurality of weights.

Figure 8:
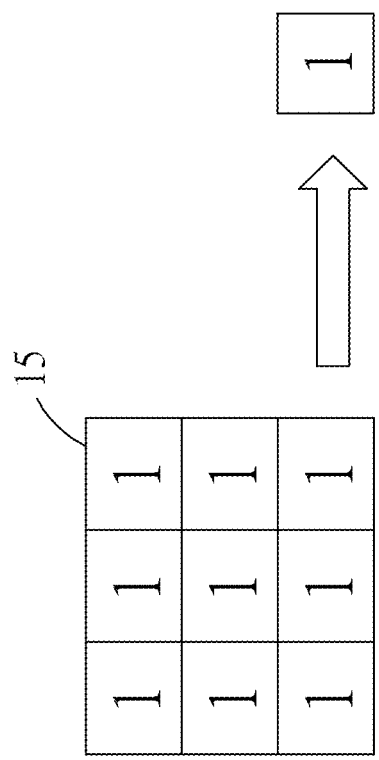
FIG. 8 is a schematic view illustrating an exemplary weight matrix and a corresponding representative value.

Specifically, the reference value is selected using one of the average of the plurality of weights, a number approximating the average of the plurality of weights, and a mode of the plurality of weights that approximates the average of the plurality of weights (the mode is the weight that appears most often among the plurality of weights). In the example of FIG. 8, since all weights included in the exemplary weight matrix 15 are 1, the average and the mode of the plurality of weights are both 1. As a result, the reference value may be 1 or a number approximating the average of the plurality of weights (e.g., 0.99).

In step S15, the intra-layer compression module 43 determines whether the reference value is substantially equal to zero (e.g., <0.005). In such a case, it may be determined that a product of each of input numbers to the neuron 141 multiplied by the reference value may also be substantially equal to zero, and the end results may not be meaningful.

As a result, when it is determined that the reference value is substantially equal to zero, the flow proceeds to step S16, in which the intra-layer compression module 43 removes the neuron 141. Afterward, the flow proceeds to step S13. Otherwise, the flow proceeds to step S17, in which the intra-layer compression module substitutes the reference value for the weight matrix 15 of the neuron 141. Afterward, the flow proceeds to step S13.

In step S13, the intra-layer compression module 43 proceeds to step S18 when determining that every neuron 141 included in the hidden layer set 13 has been processed using the above procedure.

By virtue of the above part of the procedure, the hidden layer set 13 may be simplified since some of the neurons 141 may be replaced by a single number and some of the neurons 141 may be removed. In effect, the data-recognition model 5 has been simplified to a certain degree at this time.

Further referring to FIGS. 9 and 10, the data-reduction procedure is to subsequently further simplify the hidden layer set 13.

Figure 9:
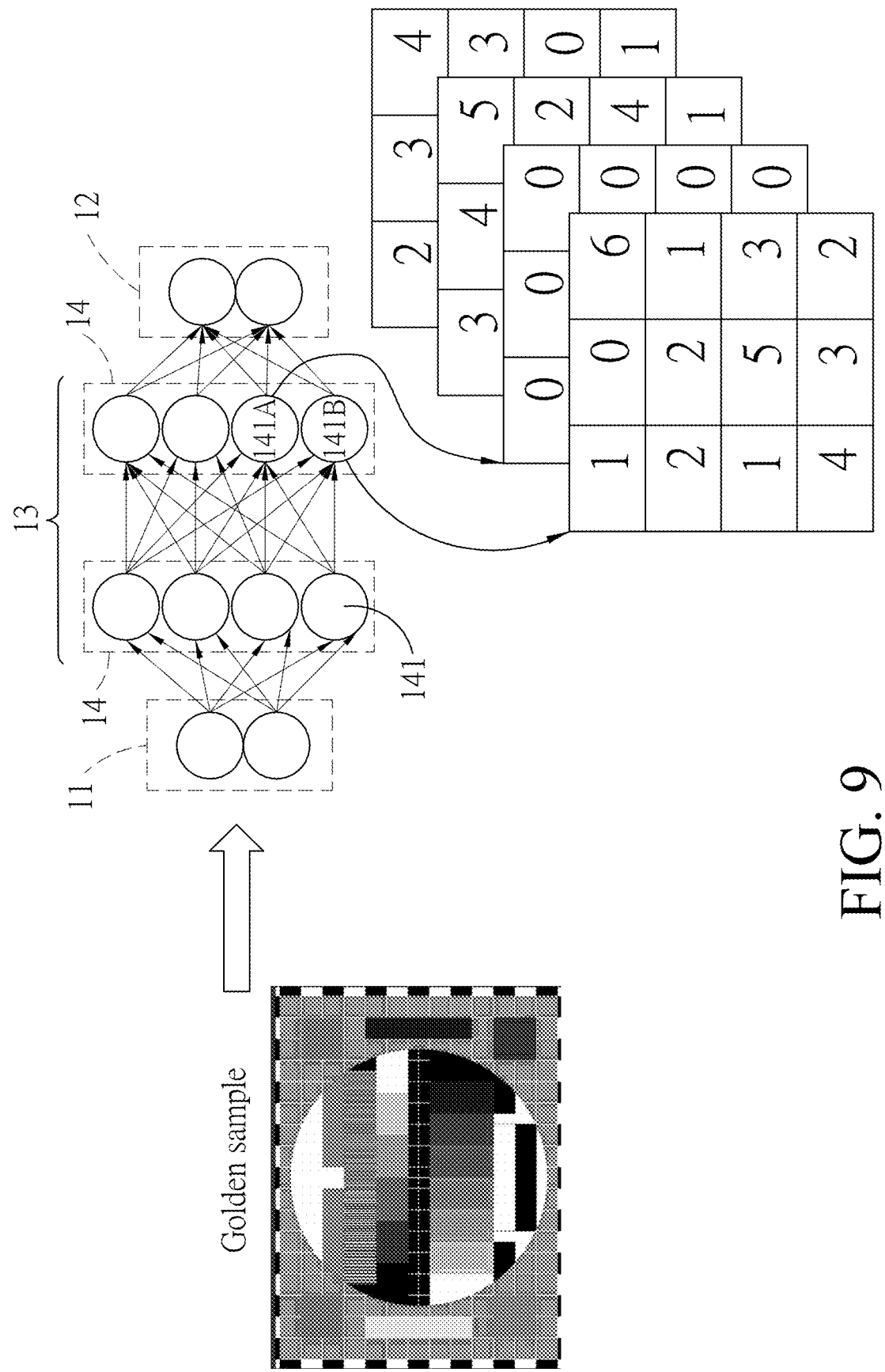
FIGS. 9 and 10 are schematic views illustrating a golden sample being fed into the data-recognition model and different sets of resulting outputs.
Figure 10:
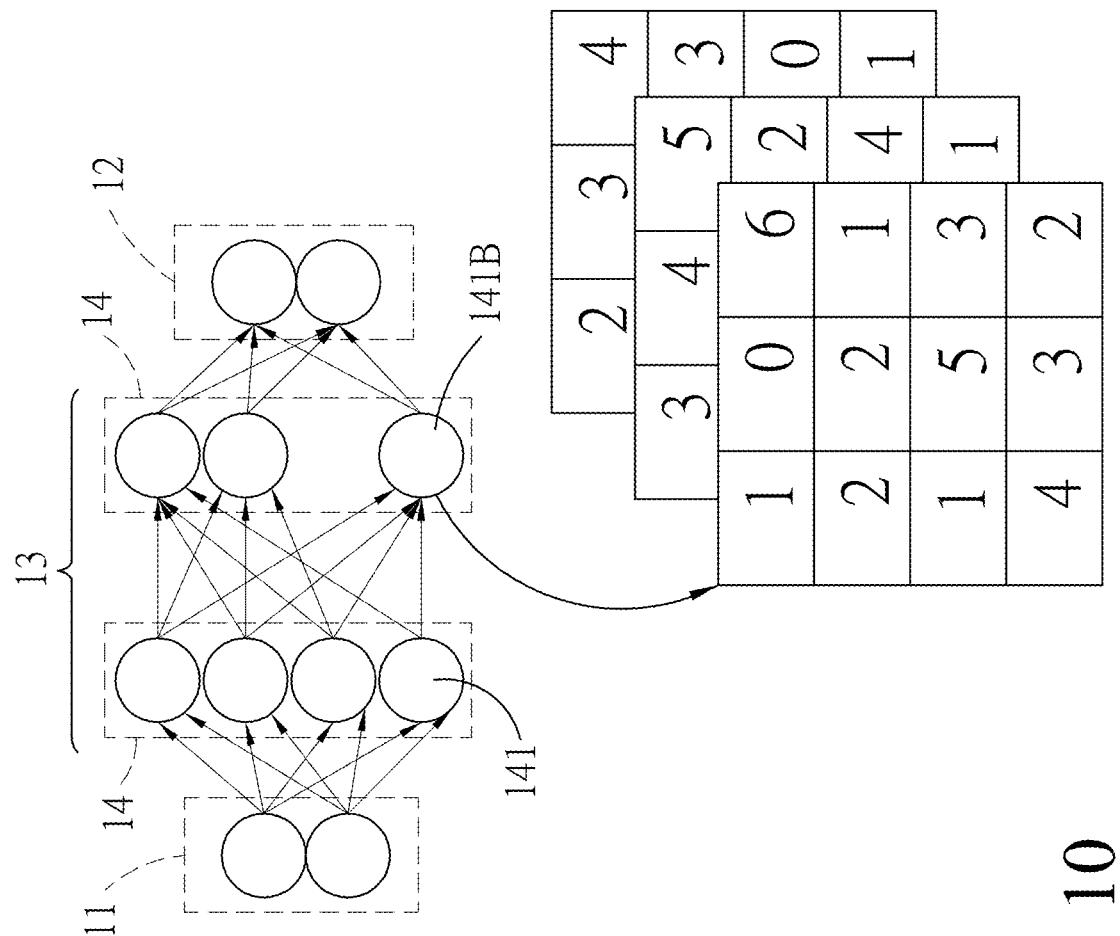

In step S18, the inter-layer compression module 44 applies at least one golden sample (e.g., a test pattern as shown in FIG. 9) to the data-recognition model 5, so as to obtain a plurality of outputs respectively from the neurons 141 in the data-recognition model 5. It is noted that for each golden sample inputted, each of the neurons 141 produces an output. For example, when ten golden samples are inputted, each of the neurons 141 produces ten outputs. Each output of each of the neurons 141 includes a plurality of output values corresponding to the weights in the weight matrix, respectively.

It is noted that in this embodiment, the inter-layer compression module 44 applies the at least one golden sample to a first hidden layer in the plurality of hidden layers 14 of the data-recognition model so as to obtain a plurality of outputs.

Afterward, the inter-layer compression module 44 applies the outputs from the neurons 141 in a preceding hidden layer (e.g., the first hidden layer) of the plurality of hidden layers 14 to a succeeding hidden layer of the plurality of hidden layers 14 that is connected to and succeeds the preceding hidden layer (e.g., a second hidden layer that is connected to the first hidden layer) so as to obtain a plurality of outputs from the neurons in the succeeding hidden layer. This may be iterated until the outputs are applied to a last hidden layer of the plurality of hidden layers 14.

In step S19, the inter-layer compression module 44 determines, for one of the neurons 141 included in the plurality of hidden layers 14 whose weight matrix has not been replaced by a representative number, whether the output of the neuron 141 is substantially equal to zero. In particular, the inter-layer compression module 44 determines whether all of the output value(s) of the neuron 141 with respect to all golden sample(s) are substantially equal to zero. In the case where a plurality of golden samples are inputted, the inter-layer compression module 44 determines whether all outputs of the neuron 141 are substantially equal to zero (i.e., no meaningful data is obtainable from the neuron 141, such as the neuron 141A partially shown in FIG. 9). When the determination is affirmative, the flow proceeds to step S20. Otherwise, as with the case of the neuron 141B shown in FIG. 9, the flow proceeds to step S21.

In step S20, the inter-layer compression module 44 removes the neuron 141 from the data-recognition model 5. Afterward, the flow proceeds to step S22. In step S21, the inter-layer compression module 44 retains the neuron 141 in the data-recognition model 5. Afterward, the flow proceeds to step S22. FIG. 10 illustrates an exemplary result of deleting the neuron 141A while the neuron 141B is retained.

In step S22, the inter-layer compression module 44 determines whether every neuron 141 included in the hidden layer set 13 has been processed using the above procedure. When the determination is affirmative, the flow proceeds to step S23. Otherwise, the flow goes back to step S19 for processing another neuron 141.

In step S23, the inter-layer compression module 44 outputs a compressed data-recognition model 5' to the data storage 1 for storage.

In brief, the data-reduction procedure as described in FIG. 6 is designed to utilize the intra-layer compression module 43 and the inter-layer compression module 44 to independently determine whether each of the neurons 141 included in the hidden layer set 13 can be removed for being unnecessary, due to having little or no effect in the overall operation. As a result, the compressed data-recognition model 5' may be simplified to have a smaller size and to involve fewer arithmetic operations. This may be particularly useful in applications involving the use of electronic devices with limited processing abilities and/or storage capacity.

Figure 11:
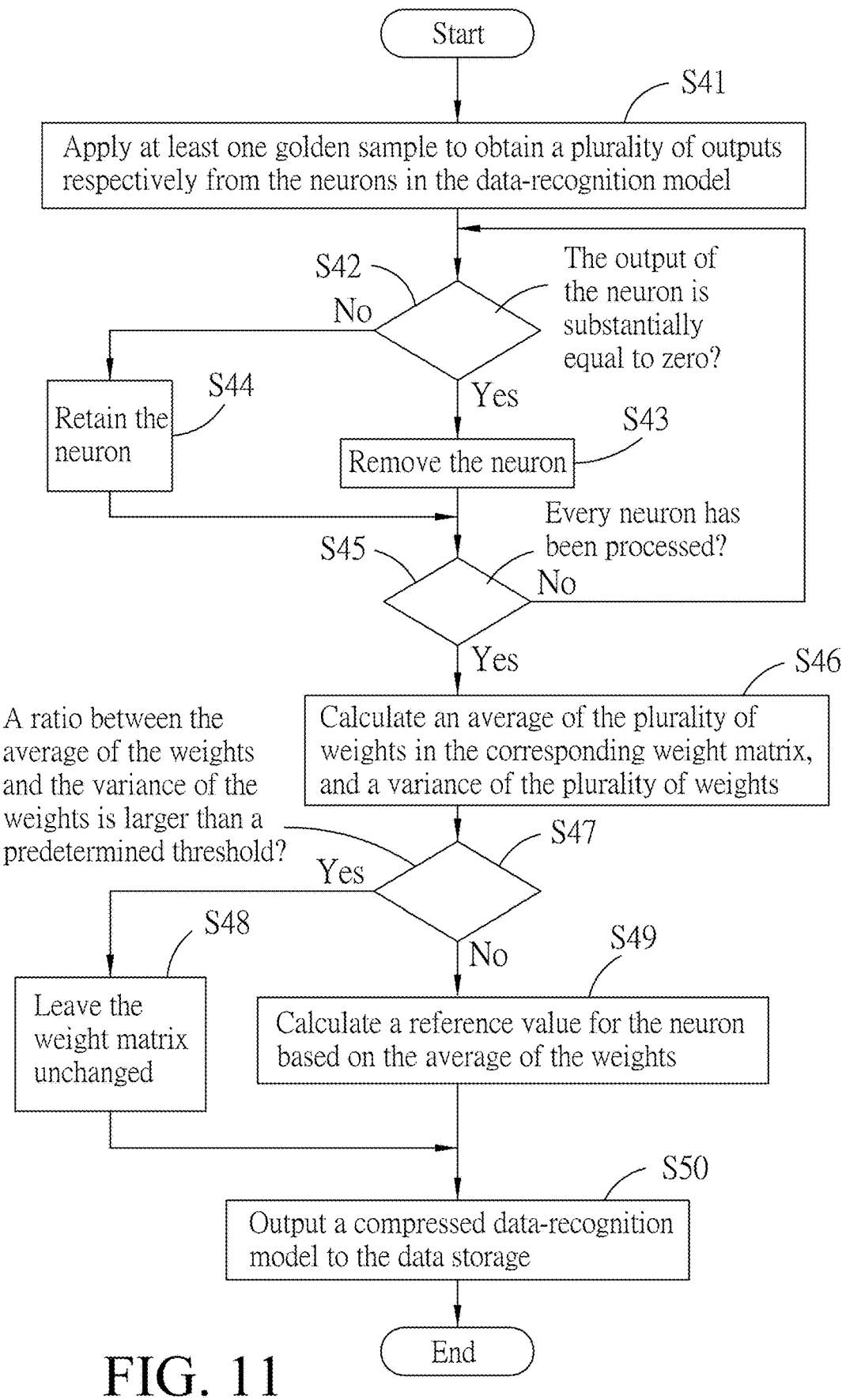
FIG. 11 is a flow chart illustrating a data-reduction procedure for determining whether one or more neurons may be removed or simplified according to one embodiment of the disclosure.

FIG. 11 is a flow chart illustrating another example of the data-reduction procedure for determining whether one or more of the neurons 141 included in the hidden layer set 13 may be removed or simplified as a representative value, according to one embodiment of the disclosure.

It is noted that the data-reduction procedure in this embodiment differs from the embodiment in FIG. 6 in that the intra-layer compression module 43 and the inter-layer compression module 44 are configured to operate in a different order.

Specifically, in step S41, the inter-layer compression module 44 applies at least one golden sample (e.g., a test pattern as shown in FIG. 9) to the data-recognition model 5, so as to obtain a plurality of outputs respectively from the neurons 141 in the data-recognition model 5. It is noted that for each golden sample inputted, each of the neurons 141 produces an output that includes a plurality of output values corresponding to the weights in the corresponding weight matrix, respectively.

The flow from step S42 going to step S45 is performed with respect to one of the neurons 141 included in the plurality of hidden layers 14.

In step S42, the inter-layer compression module 44 determines whether the output of the neuron 141 is substantially equal to zero. In particular, the inter-layer compression module 44 determines whether all of the output values of the output of the neuron 141 are substantially equal to zero. In the case where a plurality of golden samples are inputted, the inter-layer compression module 44 determines whether all outputs of the neuron 141 are substantially equal to zero (i.e., no meaningful data is obtainable from the neuron 141, such as the neuron 141A shown in FIG. 9). When the determination is affirmative, the flow proceeds to step S43. Otherwise, as with the case of the neuron 141B shown in FIG. 9, the flow proceeds to step S44.

In step S43, the inter-layer compression module 44 removes the neuron 141 from the data-recognition model 5. Afterward, the flow proceeds to step S45. In step S44, the inter-layer compression module 44 retains the neuron 141 in the data-recognition model 5. Afterward, the flow proceeds to step S45.

In step S45, the inter-layer compression module 44 determines whether every neuron 141 included in the hidden layer set 13 has been processed using the above procedure. When the determination is affirmative, the flow proceeds to step S46. Otherwise, the flow goes back to step S41 for processing another neuron 141.

Afterward, in step S46, for each of the neurons 141 included in the plurality of hidden layers 14, the intra-layer compression module 43 calculates an average of the plurality of weights in the corresponding weight matrix, and a variance of the plurality of weights (which indicates how far the values of plurality of weights generally deviate from the average of the plurality of weights). The flow from step S47 moving into step S50 is performed with respect to each of the neurons 141.

In step S47, the intra-layer compression module 43 determines whether a ratio between the average of the plurality of weights and the variance of the plurality of weights (e.g., a ratio of the variance to the average) is larger than a predetermined threshold. In this embodiment, the predetermined threshold is 0.1.

When the determination is affirmative, it may be determined that the plurality of weights in the weight matrix are generally relatively far from the average. In such a case, the flow proceeds to step S48. Otherwise (when it is determined that the ratio of the variance of the plurality of weights to the average of the plurality of weights is not larger than the predetermined threshold), the flow proceeds to step S49.

In step S48, the intra-layer compression module 43 leaves the weight matrix unchanged. Then, the flow proceeds to step S50.

In step S49, the intra-layer compression module 43 calculates a reference value for the neuron 141 based on the average of the plurality of weights, and substitutes the reference value for the weight matrix of the neuron 141. It is noted that calculation of the reference value in step S49 may be done in a manner similar to that as described in step S14. Then, the flow proceeds to step S50.

In step S50, the intra-layer compression module 43 outputs a compressed data-recognition model 5' to the data storage 1 for storage.

In brief, the data-reduction procedure in this embodiment as described in FIG. 11 has benefits that are similar to that as described in the embodiment of FIG. 6.

It is noted that while in this embodiment, both the intra-layer compression module 43 and the inter-layer compression module 44 are utilized to perform operations for simplifying the data-recognition model 5, in other embodiments, the data reduction procedure performed by each of the intra-layer compression module 43 and the inter-layer compression module 44 may be done independently and/or separately for generating a compressed data-recognition model.

Figure 12:
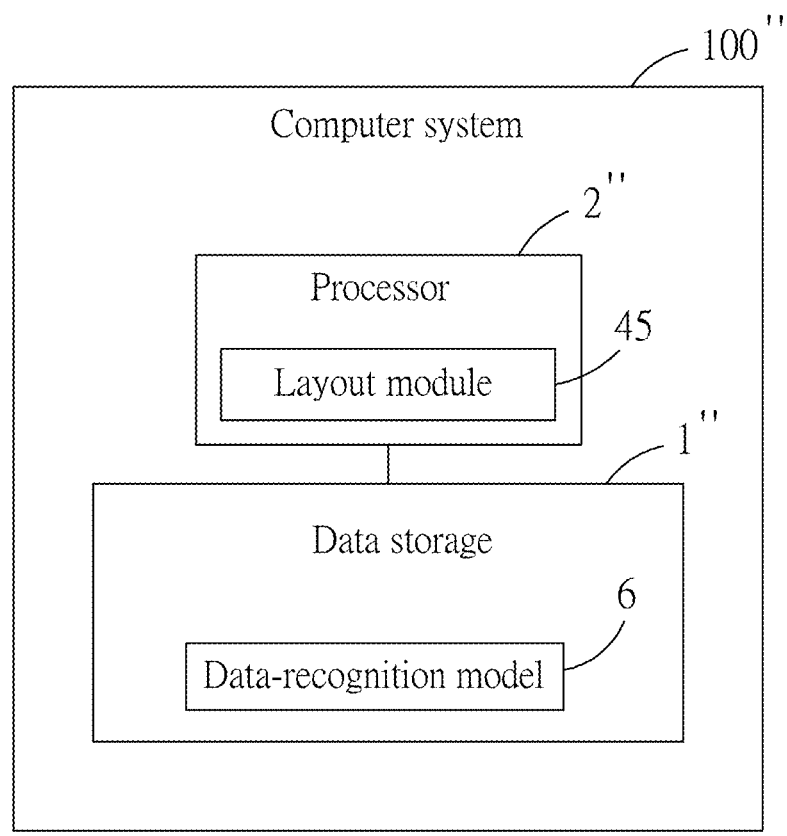
FIG. 12 is a block diagram illustrating components of a computer system according to one embodiment of the disclosure.

FIG. 12 is a block diagram illustrating components of a computer system 100" according to one embodiment of the disclosure. In this embodiment, the computer system 100" includes a data storage 1" and a processor 2". The data storage 1" and the processor 2" may be embodied using similar components of the data storage 1 and the processor 2 as described in the embodiment of FIG. 2.

In this embodiment, the processor 2" includes a layout module 45 configured to generate a layout of logic circuits that corresponds with a data-recognition model 6 stored in the data storage 1" (which may be a data-recognition model 5 that has yet to be processed using the above-described data-reduction procedure, or a compressed data-recognition model 5'). In this embodiment, the data-recognition model 6 corresponds with the compressed data-recognition model 5', and includes a hidden layer set 13 including a plurality of hidden layers 14 that are connected in series, where each of the plurality of hidden layers 14 includes a plurality of neurons 141 (see FIG. 7). Each of the neurons 141 has a weight matrix containing a plurality of weights respectively for a plurality of multiplication operations. For example, a weight of 15 indicates an operation of "multiply by 15". In this embodiment, the weights of the weight matrix are constants, and the weight matrix may be in the form of a 3-by-3 matrix having nine weights.

The layout module 45 may be implemented using software or firmware stored in the data storage 1" executed by the processor 2", and/or specifically designed hardware such as an application-specific integrated circuit (ASIC) chip, a programmable logic device (PLD).

The logic circuits may include circuits for performing multiplication operations (e.g., multiplying a parameter with the weights included in a weight matrix). The layout of logic circuits may then be used in physically manufacturing an artificial neural network (ANN) chip.

Figure 13:
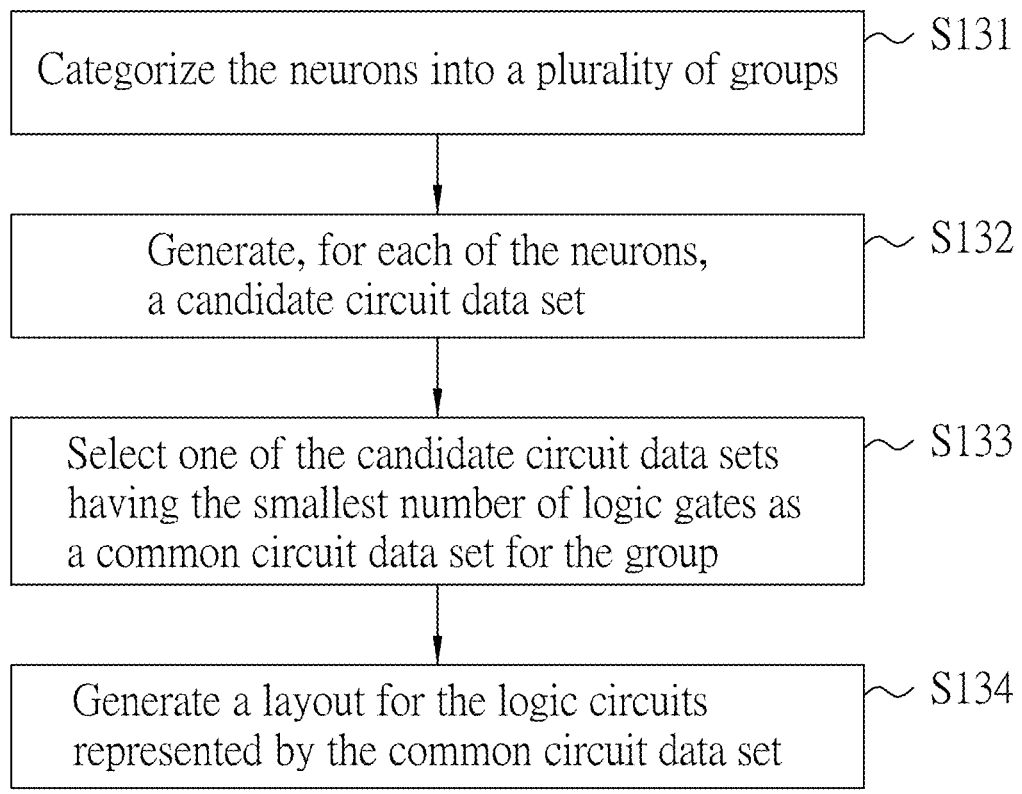
FIG. 13 is a flow chart illustrating a layout procedure for generating the layout of logic circuits corresponding with the data-recognition model according to one embodiment of the disclosure.

FIG. 13 is a flow chart illustrating a layout procedure for generating the layout of logic circuits corresponding with the data-recognition model 6 according to one embodiment of the disclosure.

In this embodiment, the procedure may be implemented using the computer system 100″ of FIG. 12. In use, a user may operate an input device (e.g., a keyboard, a mouse, etc.) to input a command for initiation of the layout procedure.

In response, in step S131, the layout module 45 performs a categorizing process to categorize the neurons 141 into a plurality of groups. In this embodiment, one purpose of such process is to place neurons 141 that are similar to one another into a same group.

Figure 14:
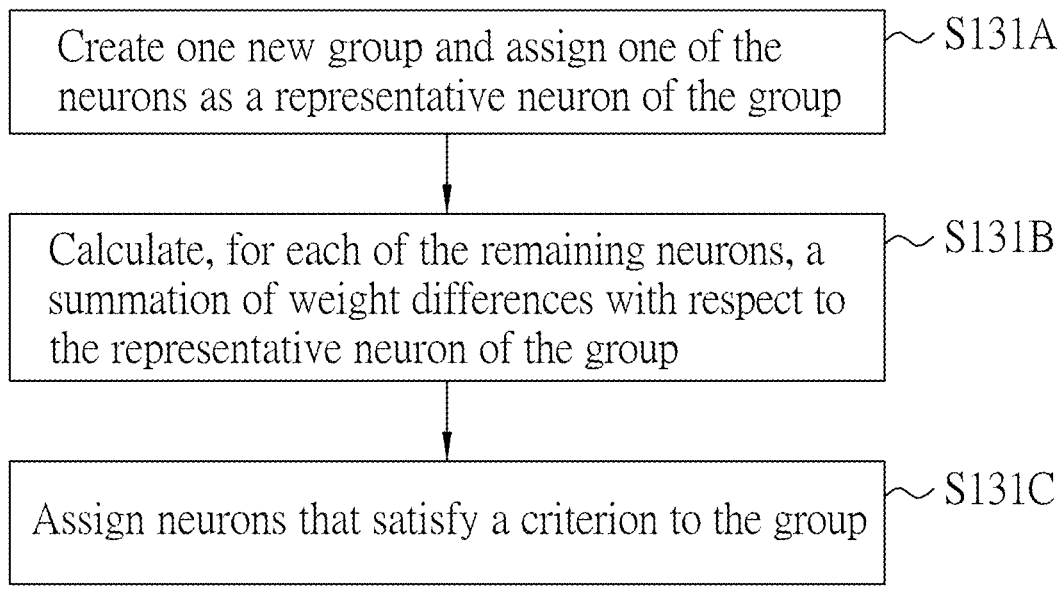
FIG. 14 is a flow chart illustrating sub-steps of categorizing a plurality of neurons into a plurality of groups.

Specifically, the operation of step S131 may be illustrated in the sub-steps as illustrated in FIG. 14.

In sub-step S131A, the layout module 45 first creates one new group (I), and assigns one of the neurons 141 as a representative neuron of the group. In use, the neurons 141 may each be assigned a serial number (e.g., $SN_1$ to $SN_{1000}$), and the categorizing process may be done with respect to each of the neurons 141 in an ascending order (i.e., 1, 2, 3, . . . , 1000), in a manner similar to performing an exhaustive search, and the neuron $SN_1$ is categorized into the group (I) as a representative neuron of the group.

Afterward, the layout module 45 determines whether each of the remaining neurons 141 satisfies a predetermined criterion with reference to the corresponding representative neuron of the group (I).

Specifically, in sub-step S131B, the layout module 45 calculates, for each of the remaining neurons 141 (e.g., from the neuron with serial number $SN_2$ to the neuron with serial number $SN_1$, a summation of weight differences with respect to the representative neuron of the group (I).

Referring to FIG. 15, in which two exemplary neurons 141 are illustrated. The neuron $SN_1$ is designated as a representative neuron. The term "weight difference" between the neuron $SN_1$ and the neuron $SN_2$ refers to a difference between a specific weight of the neuron $SN_1$ and a specific weight of the neuron $SN_2$ that are at the same position in the weight matrix. For example, a weight at the first row, first column of the weight matrix of the neuron $SN_1$ (denoted as $A_{1,1}$) is 9, a weight at the first row, first column of the weight matrix of the neuron $SN_2$ (denoted as $B_{1,1}$) is 8, and a corresponding weight difference (denoted as $WD_{1,1}$) is 1.

The term "summation of weight differences" refers to a summation of absolute values respectively of the weight differences. In the example of FIG. 15, the non-zero weight differences includes $|WD_{1,1}|=1$, $|WD_{2,3}|=2$, and $|WD_{3,1}|=1$. As a result, the summation of weight differences equals four.

In this embodiment, the predetermined criterion indicates that the summation of weight differences with respect to the representative neuron $SN_1$ is smaller than a predetermined threshold (e.g., five). In sub-step S131C, when a specific neuron satisfies this criterion, the layout module 45 assigns the specific neuron to the group (I).

After all neurons 141 have been compared with the representative neuron $SN_1$, when it is determined that at least one neuron 141 remains not having been categorized (i.e., have not been assigned to the group (I)) the layout module 45 may create a new group (II), and select one of the remaining neurons 141 as the representative neuron of the group (II) (e.g., one that has the smallest serial number, such as neuron $SN_5$). Then, the above procedure may be done for the remaining neurons 141 to determine which one(s) of the remaining neurons 141 is to be assigned to the group (II).

The above procedure may be iterated until all of the neurons 141 have been assigned to one of the groups. As a result, a plurality of groups each having a representative neuron will be defined. It should be noted that a specific group may contain only one neuron 141 (as the representative neuron) in the case that no remaining neuron satisfying the predetermined criterion is found.

In step S132, the layout module 45 generates, for each of the neurons 141, a candidate circuit data set representing a plurality of logic circuits that correspond respectively to the multiplication operations. The layout module 45 also calculates, for each of the neurons 141, a total number of logic gates used for constituting the logic circuits.

In one example, the group (I) includes the neurons $SN_1$, $SN_2$ and $SN_{100}$, and in this step, the layout module 45 generates a candidate circuit data set $D_1$ and a number of logic gates $N_1$ for the neuron $SN_1$, a candidate circuit data set $D_2$ and a number of logic gates $N_2$ for the neuron $SN_2$, and a candidate circuit data set $D_{100}$ and a number of logic gates $N_{100}$ for the neuron $SN_{100}$, as shown in the following Table 1.

TABLE 1

| Group (I) | | |
|---|---|---|
| Neuron $SN_1$ | Candidate circuit data set $D_1$ | Number of logic gates $N_1 = 100$ |
| Neuron $SN_2$ | Candidate circuit data set $D_2$ | Number of logic gates $N_2 = 300$ |
| Neuron $SN_{100}$ | Candidate circuit data set $D_{100}$ | Number of logic gates $N_{100} = 200$ |

For each of the neurons depicted in FIG. 15, the candidate circuit data set represents nine logic circuits that correspond respectively to the multiplication operations, which in turn correspond respectively to the weights included in the weight matrix of the neuron. Each of the logic circuits of the candidate circuit data set includes: a combination of logic gates (e.g., an NAND gate, a NOR gate, an inverter, etc.) that form, for example, a multiplexer, an adder, a shifter, a register, etc.; an input port for receiving an input parameter used in the multiplication operation with the weight matrix; and an output port for outputting a calculation result of the multiplication operation. Since each weight is a constant, the logic circuit corresponding to the weight needs only one input port for receiving the input parameter.

For the exemplary neuron $SN_1$ of FIG. 15, the candidate circuit data set $D_1$ may include nine logic circuits each corresponding with a multiplying operation with one of the weights (i.e., multiply by 9, 36, 27, 7, 97, 35, 36, 1 and 77, respectively). The number of logic gates $N_1$ indicates the total number of logic gates for implementing the nine logic circuits.

In step S133, for each of the groups, from among the candidate circuit data sets respectively for the neurons in the group, the layout module 45 selects one of the candidate circuit data sets having the smallest number of logic gates as a common circuit data set for the group. For example, in the example of the Table 1, the number of logic gates $N_2$ is the smallest for Group (I), and the corresponding candidate circuit data set $D_2$ is selected as the common circuit data set for Group (I).

In step S134, the layout module 45 generates a layout for the logic circuits represented by the common circuit data set. The layout may be represented in the form of an electronic file that is readable by an electronic device that executes a specific application (e.g., a circuit simulation program), and the electronic file may include a schematic diagram illustrating the layout, codes describing the layout, etc.

In this manner, in manufacturing the ANN chip, the circuit structure for the neurons 141 included in a specific group is implemented using the common circuit data set. One effect of such a configuration is that, since the common circuit data set has the lowest number of logic gates, the size of the ANN chip may be made smaller. It is noted that prior to selecting the common circuit data set, all neurons 141 have been categorized based on similarity such that the neurons 141 being assigned to the same group are relatively similar to one another, so the same circuit structure may be applied to each of the neurons 141 without inducing a meaningful error.

In cases where the data-recognition model 6 includes a large number of neurons 141 (e.g., more than 10,000), if the neurons 141 may be categorized into a smaller number of groups (e.g., 3,000), the total number of logic gates needed for implementing the data-recognition model 6 may be reduced by around 70 percent.

In one implementation, the operation of step S132 may be done in an alternative manner. Specifically, for each of the groups, the layout module 45 generates a circuit data set as the common circuit data set, representing a plurality of logic circuits that correspond respectively to the multiplication operations of the weights of the corresponding representative neuron. That is to say, the generation of the candidate circuit data sets and selection of the common circuit data set from among the candidate circuit data sets are omitted. As such, the circuit data set for the representative neuron is directly used as the common circuit data set. In this manner, the operation of step S132 may be simplified when each of the groups contains a large number of neurons 141.

In brief, the above procedure first categorizes the neurons 141 of the data-recognition model 6 into different groups, and generates a common circuit data set for all of the neurons 141 in each group. As such, the resulting data-recognition model 6 may be implemented as a part of the ANN chip with a reduced number of logic gates.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiment) but is intended to cover various arrangements included within the spirit and scope of the broadest interpretation so as to encompass all such modifications and equivalent arrangements.

What is claimed is:

1. A method for establishing a data-recognition model, the method being implemented by a computer system that stores a deep neural network (DNN) and a set of a number (X) of dithering algorithms, where X≥2, the method comprising steps of:
   A) generating a number (Z) of Y-combinations of dithering algorithms from the set of the number (X) of dithering algorithms, each of the Y-combinations including a number (Y) of dithering algorithms, where 1≤Y≤(X−1) and the number (Z) is equal to xCy;
   B) for each of the number (Z) of Y-combinations of dithering algorithms, using the number (Y) of dithering algorithms of the Y-combination to perform a dithering operation on a to-be-processed data group represented in (a) number of bit(s), so as to obtain, in total, a number (Z) of size-reduced data groups each being represented in (b) number of bit(s), where 1≤b≤(a−1);
   C) performing a number (Z) of training operations on the DNN using the number (Z) of size-reduced data groups, respectively, so as to generate, for each of the number (Z) of training operations, a DNN model, a training result of the training operation, and a steady deviation between the training result and a predetermined expectation; and
   D) selecting one of the number (Z) of Y-combinations of dithering algorithms corresponding to the size-reduced data group that results in the training result with the smallest steady deviation as a filter module, selecting the corresponding DNN model as the data-recognition model, and generating layout of logic circuits hardware corresponding to the established data-recognition model.

2. The method of claim 1, wherein:
   step A) includes generating a number (Z) of 2-combinations of dithering algorithms from the set of the number (X) of dithering algorithms;
   step B) includes, for each of the number (Z) of 2-combinations of dithering algorithms,
   performing a dithering operation on the to-be-processed data group using one of the dithering algorithms in the 2-combination, so as to obtain a first part of the size-reduced data group being represented in (m) number of bit(s),
   performing a dithering operation on the to-be-processed data group using another one of the dithering algorithms in the 2-combination, so as to obtain a second part of the size-reduced data group being represented in (n) number of bit(s), where m+n=b, and
   combining the first part and the second part to obtain the size-reduced data group.

3. The method of claim 1, wherein in step C), each of the training operations includes the sub-steps of:
   C1) inputting one of the size-reduced data groups into the DNN, so as to obtain the training result;
   C2) comparing the training result with the predetermined expectation so as to obtain a deviation between the training result and the predetermined expectation as an intermediate deviation;
   C3) inputting the intermediate deviation into the DNN;
   C4) repeating sub-steps C1) to C3) until the intermediate deviation currently obtained in sub-step C1) does not vary with respect to the intermediate deviation obtained in a previous iteration of sub-step C1); and
   C5) after sub-step C4), outputting the DNN as the DNN model and the intermediate deviation currently obtained in sub-step C1) as the steady deviation.

4. The method of claim 2, wherein in step C), each of the training operations includes the sub-steps of:
   C1) inputting one of the size-reduced data groups into the DNN, so as to obtain the training result;
   C2) comparing the training result with the predetermined expectation so as to obtain a deviation between the training result and the predetermined expectation as an intermediate deviation;
   C3) inputting the intermediate deviation into the DNN;
   C4) repeating sub-steps C1) to C3) until the intermediate deviation currently obtained in sub-step C1) does not vary with respect to the intermediate deviation obtained in a previous iteration of sub-step C1); and
   C5) after sub-step C4), outputting the DNN as the DNN model and the intermediate deviation currently obtained in sub-step C1) as the steady deviation.

5. The method of claim 1, wherein:
   the data-recognition model includes a hidden layer set including a plurality of hidden layers that are connected in series, each of the plurality of hidden layers including a plurality of neurons, each of the neurons having a weight matrix containing a plurality of weights; and
   the method further comprises
      E) for each of the neurons included in the plurality of hidden layers,
      calculating an average of the plurality of weights of the neuron, and a variance of the plurality of weights,
      when it is determined that a ratio between the average of the plurality of weights and the variance of the plurality of weights is larger than a predetermined threshold, keeping the weight matrix unchanged,
      when it is determined that the ratio between the average of the plurality of weights and the variance of the plurality of weights is not larger than the predetermined threshold, calculating a reference value for the neuron based on the average of the plurality of weights,
      when it is determined that the reference value is substantially equal to zero, deleting the neuron from the data-recognition model, and
   when it is determined that the reference value is substantially not equal to zero, substituting the reference value for the weight matrix of the neuron; and
      F) after step E), applying at least one golden sample to the data-recognition model, so as to obtain a plurality of outputs respectively from the neurons in the data-recognition model, and for each of the neurons included in the plurality of hidden layers and having the weight matrix, deleting the neuron from the data-recognition model when it is determined that the output of the neuron is substantially equal to zero and retaining the neuron when otherwise.

6. The method of claim 5, wherein the reference value is the average of the plurality of weights, a number approximating the average of the plurality of weights, or a mode of the plurality of weights that approximates the average of the plurality of weights.

7. The method of claim 5, wherein step F) includes:
   applying the golden sample to a first hidden layer in the plurality of hidden layers of the data-recognition model so as to obtain a plurality of outputs respectively from the neurons in the first hidden layer, each of the outputs including a plurality of output values;
   applying the outputs from the neurons in a preceding hidden layer of the plurality of hidden layers to a succeeding hidden layer of the plurality of hidden layers that is connected to and succeeds the preceding hidden layer so as to obtain a plurality of outputs from the neurons in the succeeding hidden layer; and
   for each of the neurons, deleting the neuron from the data-recognition model when it is determined that the output values of the outputs from the neuron are all substantially equal to zero, and retaining the neuron when otherwise.

8. The method of claim 1, wherein:
   the data-recognition model includes a hidden layer set including a plurality of hidden layers that are connected in series, each of the plurality of hidden layers including a plurality of neurons, each of the neurons having a weight matrix containing a plurality of weights; and
   the method further comprises
      G) applying at least one golden sample to the data-recognition model, so as to obtain a plurality of outputs respectively from the neurons in the data-recognition model, and for each of the neurons included in each of the plurality of hidden layers, deleting the neuron from the data-recognition model when it is determined that the output of the neuron is substantially equal to zero and retaining the neuron when otherwise; and
      H) after step G), for each of the neurons included in the plurality of hidden layers,
      calculating an average of the plurality of weights of the neuron and a variance of the plurality of weights,
      when it is determined that a ratio between the average of the plurality of weights and the variance of the plurality of weights is larger than a predetermined threshold, keeping the weight matrix unchanged,
      when it is determined that the ratio of the average of the plurality of weights and the variance of the plurality of weights is not larger than the predetermined threshold, calculating a reference value for the neuron based on the average of the plurality of weights and substituting the reference value for the weight matrix of the neuron.

9. The method of claim 8, wherein step G) includes:
   applying the golden sample to a first hidden layer in the plurality of hidden layers of the data-recognition model so as to obtain a plurality of outputs respectively from the neurons in the first hidden layer, each of the outputs including a plurality of output values;
   applying the outputs from the neurons in a preceding hidden layer of the plurality of hidden layers to a succeeding hidden layer of the plurality of hidden layers that is connected to and succeeds the preceding hidden layer so as to obtain a plurality of outputs from the neurons in the succeeding hidden layer; and
   for each of the neurons, deleting the neuron from the data-recognition model when it is determined that the output values of the outputs from the neuron are all substantially equal to zero, and retaining the neuron when otherwise.

10. The method of claim 9, wherein the reference value is the average of the plurality of weights, a number approximating the average of the plurality of weights, or a mode of the plurality of weights that approximates the average of the plurality of weights.

11. The method of claim 1, wherein:
   the data-recognition model includes a hidden layer set including a plurality of hidden layers that are connected in series, each of the plurality of hidden layers including a plurality of neurons, each of the neurons having a weight matrix containing a plurality of weights respectively for a plurality of multiplication operations; and the method further comprises I) categorizing the plurality of neurons into a plurality of groups, wherein each of the groups includes one representative neuron, and for each neuron included in one of the groups, the weights in the weight matrix of the neuron satisfy a predetermined criterion with reference to the representative neuron of said one of the groups;

J) generating, for each of the neurons, a candidate circuit data set representing a plurality of logic circuits that correspond respectively to the multiplication operations, and a total number of logic gates for implementing the logic circuits; and K) for each of the groups, from among the candidate circuit data sets respectively for the neurons, selecting one candidate circuit data set having the smallest number of logic gates as a common circuit data set, and generating a layout for the logic circuits represented by the common circuit data set.

12. The method of claim 11, wherein step I) includes, for each of the groups:

calculating, for each of the neurons that has not been categorized, a summation of weight differences with respect to the representative neuron of the group, each of the weight differences being calculated as an absolute value of a difference between one of the weights of the neuron and a corresponding one of the weights of the representative neuron; and when it is determined that a neuron satisfies the predetermined criterion with the representative neuron, assigning the neuron to the group, wherein the predetermined criterion is that the summation is smaller than a predetermined threshold.

13. The method of claim 11, wherein each of the logic circuits includes an input port for receiving an input parameter used in the multiplication operation with the weight, and an output port for outputting a calculation result of the multiplication operation.

14. The method of claim 1, wherein:

the data-recognition model includes a hidden layer set including a plurality of hidden layers that are connected in series, each of the plurality of hidden layers including a plurality of neurons, each of the neurons having a weight matrix containing a plurality of weights respectively for a plurality of multiplication operations; and the method further comprises L) categorizing the plurality of neurons into a plurality of groups, wherein each of the groups includes one representative neuron, and for each neuron included in one of the groups, the weights in the weight matrix of the neuron satisfy a predetermined criterion with reference to the representative neuron of said one of the groups;

M) generating, for each of the groups, a common circuit data set representing a plurality of logic circuits that correspond respectively to the multiplication operations of the weights of the representative neuron of the group; and N) generating, for each of the groups, a layout for the logic circuits represented by the common circuit data set.

15. The method of claim 14, wherein step L) includes, for each of the groups:

assigning one neuron that has not been categorized into the group as the representative neuron of the group;

calculating, for each of the neurons that has not been categorized, a summation of differences of weights, with respect to the representative neuron, in absolute value; and when it is determined that a neuron satisfies the criterion with respect to the representative neuron, assigning the neuron to the group, wherein the criterion is that the summation is smaller than a predetermined threshold.

16. The method of claim 14, wherein each of the logic circuits of the common circuit data set includes an input port for receiving an input parameter so as to perform a calculation using the weight matrix, and an output port for outputting a calculation result.

17. A computer system for establishing a data-recognition model, comprising:

a data storage (1) that stores a deep neural network (DNN) and a set of a number (X) of dithering algorithms, where X≥2; and a processor (2) coupled to said data storage (1) and programmed to implement the steps of:

A) generating a number (Z) of Y-combinations of dithering algorithms from the set of the number (X) of dithering algorithms, each of the Y-combinations including a number (Y) of dithering algorithms, where 1≤Y≤(X−1) and the number (Z) is equal to xCy;

B) for each of the number (Z) of Y-combinations of dithering algorithms, using the number (Y) of dithering algorithms of the Y-combination to perform a dithering operation on a to-be-processed data group represented in (a) number of bit(s), so as to obtain, in total, a number (Z) of size-reduced data groups each being represented in (b) number of bit(s), where 1≤b≤(a−1);

C) performing a number (Z) of training operations on the DNN using the number (Z) of size-reduced data groups, respectively, so as to generate, for each of the number (Z) of training operations, a DNN model, a training result of the training operation, and a steady deviation between the training result and a predetermined expectation; and D) selecting one of the number (Z) of Y-combinations of dithering algorithms corresponding to the size-reduced data group that results in the training result with the smallest steady deviation as a filter module, selecting the corresponding DNN model as the data-recognition model, and generating layout of logic circuits hardware corresponding to the established data-recognition model.

18. The computer system of claim 17, wherein:

said processor (2) is programmed to, in step A), generate a number (Z) of 2-combinations of dithering algorithms from the set of the number (X) of dithering algorithms;

said processor (2) is programmed to, in step B), for each of the number (Z) of 2-combinations of dithering algorithms, perform a dithering operation on the to-be-processed data group using one of the dithering algorithms in the 2-combination, so as to obtain a first part of the size-reduced data group being represented in (m) number of bit(s), perform a dithering operation on the to-be-processed data group using another one of the dithering algorithms in the 2-combination, so as to obtain a second part of the size-reduced data group being represented in (n) number of bit(s), where m+n=b, and combine the first part and the second part to obtain the size-reduced data group.

19. The computer system of claim 17, wherein each of the training operations performed by said processor (2) includes the sub-steps of:
C1) inputting one of the size-reduced data groups into the DNN, so as to obtain the training result;
C2) comparing the training result with the predetermined expectation so as to obtain a deviation between the training result and the predetermined expectation as an intermediate deviation;
C3) inputting the intermediate deviation into the DNN;
C4) repeating sub-steps C1) to C3) until the intermediate deviation currently obtained in sub-step C1) does not vary with respect to the intermediate deviation obtained in a previous iteration of sub-step; and
C5) after sub-step C4), outputting the DNN as the DNN model and the intermediate deviation currently obtained in sub-step C1) as the steady deviation.

20. The computer system of claim 18, wherein each of the training operations performed by said processor (2) includes the sub-steps of:
C1) inputting one of the size-reduced data groups into the DNN, so as to obtain the training result;
C2) comparing the training result with the predetermined expectation so as to obtain a deviation between the training result and the predetermined expectation as an intermediate deviation;
C3) inputting the intermediate deviation into the DNN;
C4) repeating sub-steps C1) to C3) until the intermediate deviation currently obtained in sub-step C1) does not vary with respect to the intermediate deviation obtained in a previous iteration of sub-step; and
C5) after sub-step C4), outputting the DNN as the DNN model and the intermediate deviation currently obtained in sub-step C1) as the steady deviation.

21. The computer system of claim 17, wherein:
the data-recognition model stored in said data storage (1) includes a hidden layer set including a plurality of hidden layers that are connected in series, each of the plurality of hidden layers including a plurality of neurons, each of the neurons having a weight matrix containing a plurality of weights; and
said processor (2) includes an intra-layer compression module (43) that is programmed to perform the step of
E) for each of the neurons included in the plurality of hidden layers, calculating an average of the plurality of weights of the neuron, and a variance of the plurality of weights,
when it is determined that a ratio between the average of the plurality of weights and the variance of the plurality of weights is larger than a predetermined threshold, keeping the weight matrix unchanged,
when it is determined that the ratio between the average of the plurality of weights and the variance of the plurality of weights is not larger than the predetermined threshold, calculating a reference value for the neuron based on the average of the plurality of weights,
when it is determined that the reference value is substantially equal to zero, deleting the neuron from the data-recognition model, and
when it is determined that the reference value is substantially not equal to zero, substituting the reference value for the weight matrix of the neuron; and said processor (2) further includes an inter-layer compression module (44) that is programmed to perform the step of
F) after step E), applying at least one golden sample to the data-recognition model, so as to obtain a plurality of outputs respectively from the neurons in the data-recognition model, and for each of the neurons included in the plurality of hidden layers and having the weight matrix, deleting the neuron from the data-recognition model when it is determined that the output of the neuron is substantially equal to zero and retaining the neuron when otherwise.

22. The computer system of claim 21, wherein the reference value is the average of the plurality of weights, a number approximating the average of the plurality of weights, or a mode of the plurality of weights that approximates the average of the plurality of weights.

23. The computer system of claim 21, wherein said inter-layer compression module (44) of said processor (2) is programmed to, in step F):
apply the golden sample to a first hidden layer in the plurality of hidden layers of the data-recognition model so as to obtain a plurality of outputs respectively from the neurons in the first hidden layer, each of the outputs including a plurality of output values;
apply the outputs from the neurons in a preceding hidden layer of the plurality of hidden layers to a succeeding hidden layer of the plurality of hidden layers that is connected to and succeeds the preceding hidden layer so as to obtain a plurality of outputs from the neurons in the succeeding hidden layer; and
for each of the neurons, delete the neuron from the data-recognition model when it is determined that the output values of the output from the neuron are all substantially equal to zero, and retain the neuron when otherwise.

24. The computer system of claim 21, wherein said intra-layer compression module (43) and said inter-layer compression module (44) are implemented using software stored in said data storage (1).

25. The computer system of claim 21, wherein said intra-layer compression module (43) and said inter-layer compression module (44) are implemented using one of firmware included in a microcontroller, an application-specific integrated circuit (ASIC) chip and a programmable logic device (PLD).

26. The computer system of claim 17, wherein:
the data-recognition model stored in said data storage (1) includes a hidden layer set including a plurality of hidden layers that are connected in series, each of the plurality of hidden layers including a plurality of neurons, each of the neurons having a weight matrix containing a plurality of weights; and
said processor (2) includes an inter-layer compression module (44) that is programmed to perform the step of
G) applying at least one golden sample to the data-recognition model, so as to obtain a plurality of outputs respectively from the neurons in the data-recognition model, and for each of the neurons included in each of the plurality of hidden layers, deleting the neuron from the data-recognition model when it is determined that the output of the neuron is substantially equal to zero and retaining the neuron when otherwise; and
said processor (2) further includes an intra-layer compression module (43) that is programmed to perform the step of H) after step G), for each of the neurons included in the plurality of hidden layers,
calculating an average of the plurality of weights of the neuron and a variance of the plurality of weights,
when it is determined that a ratio between the average of the plurality of weights and the variance of the plurality of weights is larger than a predetermined threshold, keeping the weight matrix unchanged,
when it is determined that the ratio of the average of the plurality of weights and the variance of the plurality of weights is not larger than the predetermined threshold, calculating a reference value of the neuron based on the average of the plurality of weights and substituting the reference value for the weight matrix of the neuron.

27. The computer system of claim 26, wherein said inter-layer compression module (44) of said processor (2) is programmed to, in step G):
apply the golden sample to a first hidden layer in the plurality of hidden layers of the data-recognition model so as to obtain a plurality of outputs respectively from the neurons in the first hidden layer, each of the outputs including a plurality of output values;
apply the outputs from the neurons in a preceding hidden layer of the plurality of hidden layers to a succeeding hidden layer of the plurality of hidden layers that is connected to and succeeds the preceding hidden layer so as to obtain a plurality of outputs from the neurons in the succeeding hidden layer; and
for each of the neurons, delete the neuron from the data-recognition model when it is determined that the output values of the output from the neuron are all substantially equal to zero, and retain the neuron when otherwise.

28. The computer system of claim 27, wherein the reference value is the average of the plurality of weights, a number approximating the average of the plurality of weights, or a mode of the plurality of weights that approximates the average of the plurality of weights.

29. The computer system of claim 26, wherein said intra-layer compression module (43) and said inter-layer compression module (44) are implemented using software stored in said data storage (1).

30. The computer system of claim 26, wherein said intra-layer compression module (43) and said inter-layer compression module (44) are implemented using one of firmware included in a microcontroller, an application-specific integrated circuit (ASIC) chip and a programmable logic device (PLD).

31. The computer system of claim 17, wherein:
the data-recognition model includes a hidden layer set including a plurality of hidden layers that are connected in series, each of the plurality of hidden layers including a plurality of neurons, each of the neurons having a weight matrix containing a plurality of weights respectively for a plurality of multiplication operations; and
said processor (2) includes a layout module (45) that is programmed to perform the steps of:
I) categorizing the plurality of neurons into a plurality of groups, wherein each of the groups includes one representative neuron, and for each neuron included in one of the groups, the weights in the weight matrix of the neuron satisfy a predetermined criterion with reference to the representative neuron of said one of the groups;
J) generating, for each of the neurons, a candidate circuit data set representing a plurality of logic circuits that correspond respectively to the multiplication operations, and a total number of logic gates for implementing the logic circuits; and
K) for each of the groups, from among the candidate circuit data sets respectively for the neurons, selecting one candidate circuit data set having the smallest number of logic gates as a common circuit data set, and generating a layout for the logic circuits represented by the common circuit data set.

32. The computer system of claim 31, wherein said layout module (45) of said processor (2) is programmed to, in step I), for each of the groups:
calculate, for each of the neurons that has not been categorized, a summation of weight differences with respect to the representative neuron of the group, each of the weight differences being calculated as an absolute value of a difference between one of the weights of the neuron and a corresponding one of the weights of the representative neuron; and
when it is determined that a neuron satisfies the predetermined criterion with the representative neuron, assign the neuron to the group, wherein the predetermined criterion is that the summation is smaller than a predetermined threshold.

33. The computer system of claim 31, wherein each of the logic circuits includes an input port for receiving an input parameter used in the multiplication operation with the weight, and an output port for outputting a calculation result of the multiplication operation.

34. The computer system of claim 17, wherein:
the data-recognition model includes a hidden layer set including a plurality of hidden layers that are connected in series, each of the plurality of hidden layers including a plurality of neurons, each of the neurons having a weight matrix containing a plurality of weights respectively for a plurality of multiplication operations; and
said processor (2) includes a layout module (45) that is programmed to perform the steps of:
L) categorizing the plurality of neurons into a plurality of groups, wherein each of the groups includes one representative neuron, and for each neuron included in one of the groups, the weights in the weight matrix of the neuron satisfy a predetermined criterion with reference to the representative neuron of said one of the groups;
M) generating, for each of the groups, a common circuit data set representing a plurality of logic circuits that correspond respectively to the multiplication operations of the weights of the representative neuron of the group; and
N) generating, for each of the groups, a layout for the logic circuits represented by the common circuit data set.

35. The computer system of claim 34, wherein said layout module (45) of said processor (2) is programmed to, in step L), for each of the groups:
assign one neuron that has not been categorized into the group as the representative neuron of the group;
calculate, for each of the neurons that has not been categorized, a summation of differences of weights, with respect to the representative neuron, in absolute value; and
when it is determined that a neuron satisfies the criterion with respect to the representative neuron, assign the neuron to the group, wherein the criterion is that the summation is smaller than a predetermined threshold.

36. The computer system of claim 34, wherein each of the logic circuits in the common circuit data set includes an input port for receiving an input parameter so as to perform a calculation using the weight matrix, and an output port for outputting a calculation result.

37. The computer system of claim 17, wherein, said data storage (1) and said processor (2) are integrated in a computer device.

38. The computer system of claim 17, wherein said data storage (1) is coupled to said processor (2) using a wired connection or a wireless connection.

39. The method of claim 1, further comprising:
integrating the established data-recognition model into a circuit simulation application, a compression application, or an application using electronic devices with limited processing abilities and/or storage capacity.

* * * * *